United States Patent [19]

Holter

[11] Patent Number: 5,730,239

[45] Date of Patent: Mar. 24, 1998

[54] VEHICLE WITH TORSION BAR HOOD LIFT ASSIST

[75] Inventor: Dean Holter, Portland, Oreg.

[73] Assignee: Freightliner Corporation, Portland, Oreg.

[21] Appl. No.: 567,345

[22] Filed: Oct. 31, 1995

[51] Int. Cl.$^6$ ................................................ B62D 25/12
[52] U.S. Cl. ........................ 180/69.21; 180/89.15; 180/89.17; 49/386
[58] Field of Search .................. 49/386, 387; 180/69.21, 180/89.15, 89.17; 186/69.2

[56] References Cited

U.S. PATENT DOCUMENTS

| | | | |
|---|---|---|---|
| 2,135,613 | 11/1938 | De Orlow | 180/69.2 |
| 3,982,600 | 9/1976 | Gerresheim et al. | |
| 4,151,891 | 5/1979 | Parr. | |
| 4,223,483 | 9/1980 | Stafford. | |
| 4,291,501 | 9/1981 | Steinberg et al. | 49/386 |
| 4,359,121 | 11/1982 | Messner et al. | |
| 4,402,111 | 9/1983 | Selby et al. | |
| 4,572,312 | 2/1986 | France et al. | 180/69.21 |
| 4,591,136 | 5/1986 | Leonard. | |
| 4,773,126 | 9/1988 | Voss. | |
| 5,101,921 | 4/1992 | West et al. | 180/69.21 |
| 5,301,469 | 4/1994 | Lyons, Sr. | 49/386 |

FOREIGN PATENT DOCUMENTS

| | | | |
|---|---|---|---|
| 1081772 | 12/1954 | France | 180/69.2 |
| 1218871 | 5/1960 | France | 180/69.21 |
| 1425928 | 3/1964 | France | 180/69.21 |

OTHER PUBLICATIONS

Freightliner Corporation Drawing No. D17-12458 showing a prior art torsion bar hood lift assist.

Photographs of prior art torsion bar assembly for Ford Aeromax vehicle.

*Primary Examiner*—Brian L. Johnson
*Assistant Examiner*—Avraham Lerner
*Attorney, Agent, or Firm*—Klarquist Sparkman Campbell Leigh & Whinston

[57] ABSTRACT

A torsion bar hood lift assist includes a torsion bar mounted with a free end portion positioned to engage and travel along a hood interior surface as the hood of the vehicle is opened and closed. As the hood is closed, the torsion bar bends and twists to store energy which is then transferred to the hood to assist in hood opening when the hood is lifted. The free end portion of the torsion bar supports a hood engagement member such as a roller to reduce friction between the torsion bar and hood as energy is transferred. The torsion bar is typically supported at two locations with a bearing block being used to further reduce friction. The free end of the torsion bar engages a hood reinforcing member or plate, which may comprise a hood mounting bracket, and travels against this plate during hood opening and closing.

22 Claims, 5 Drawing Sheets

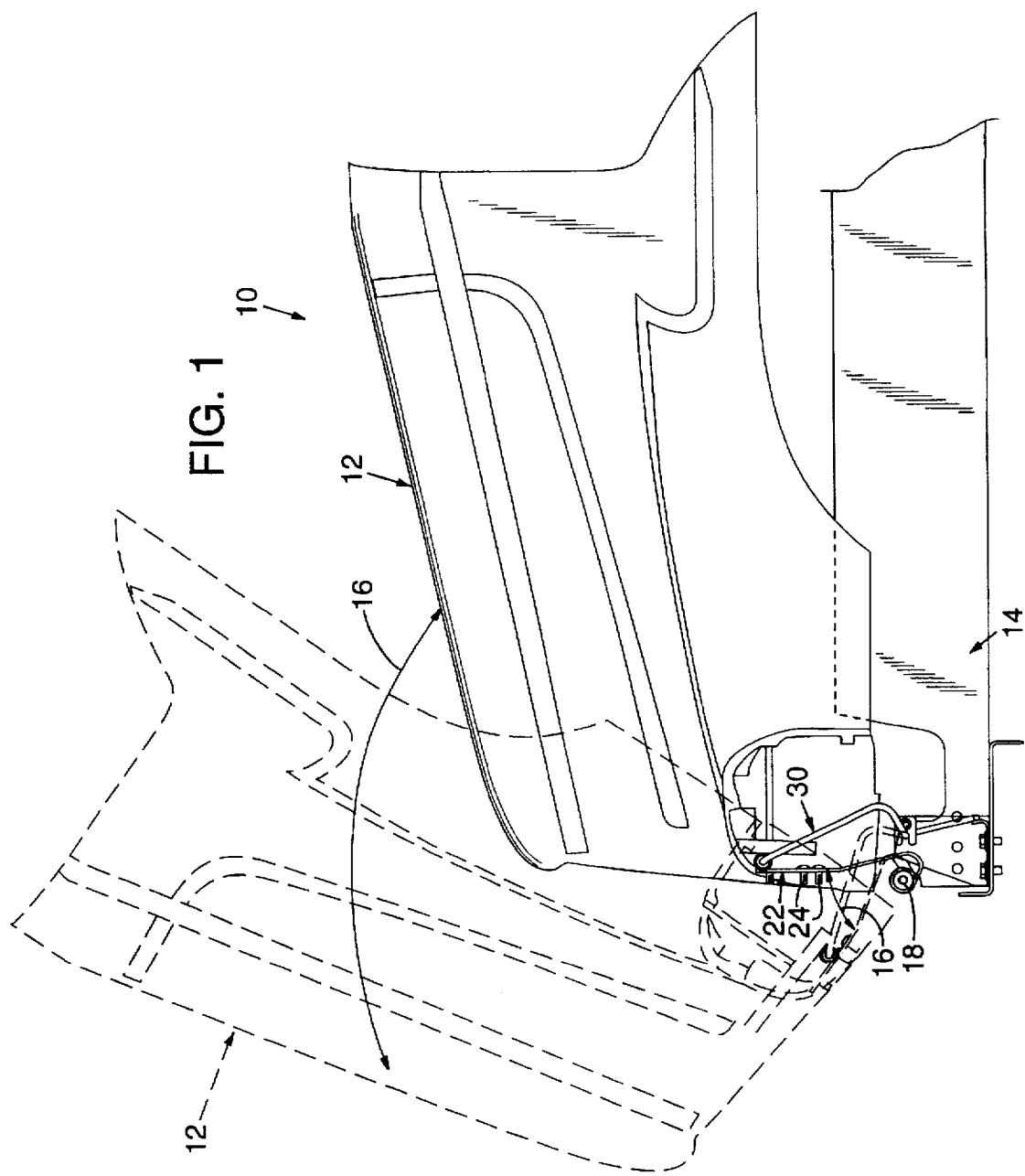

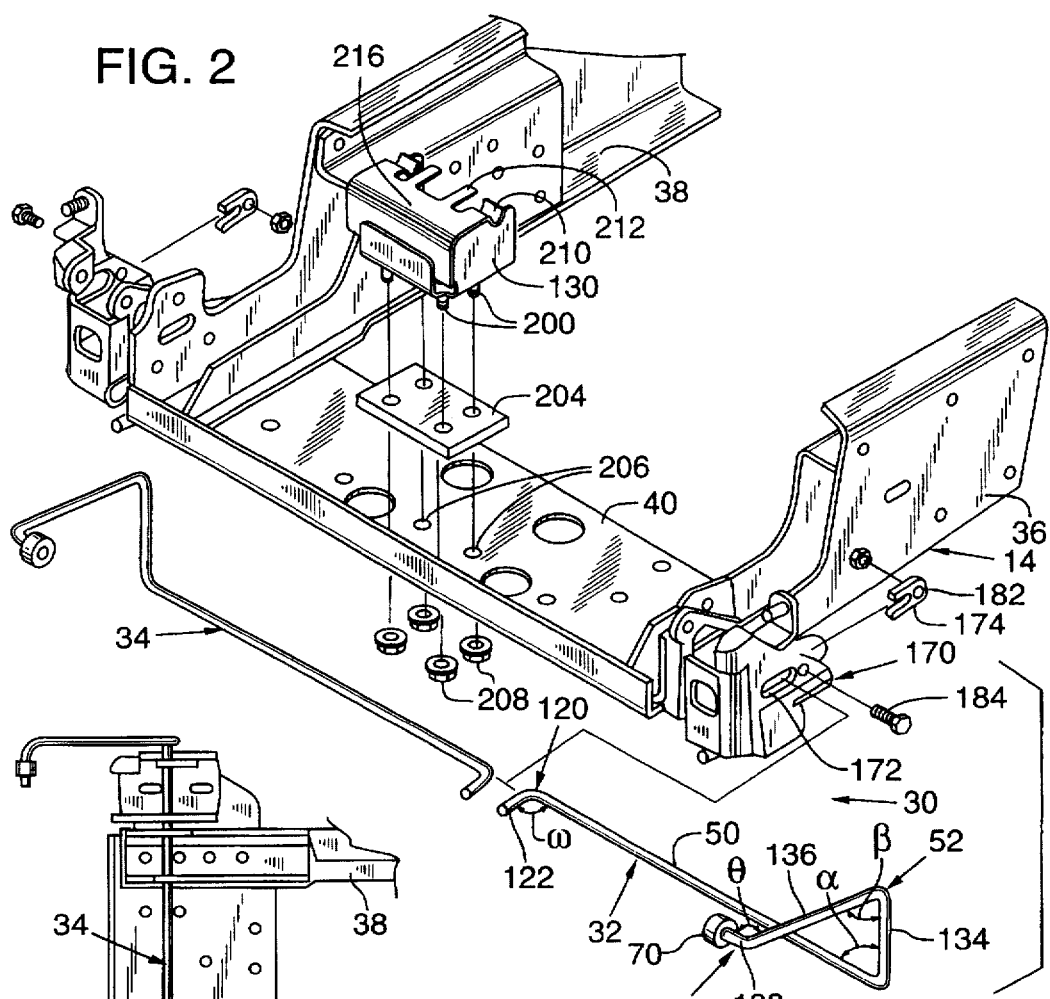
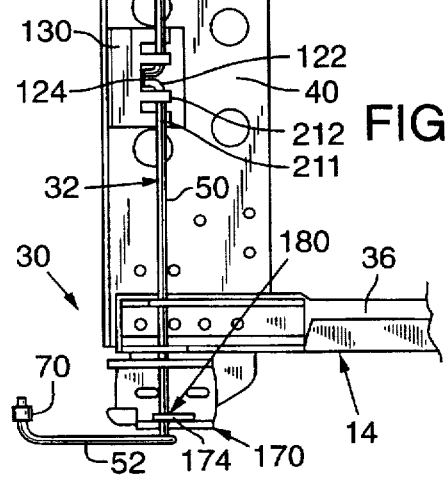
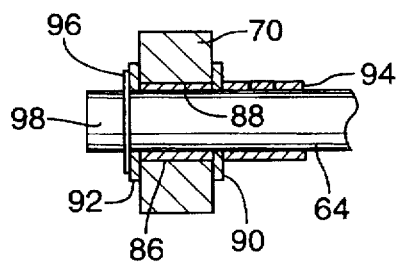

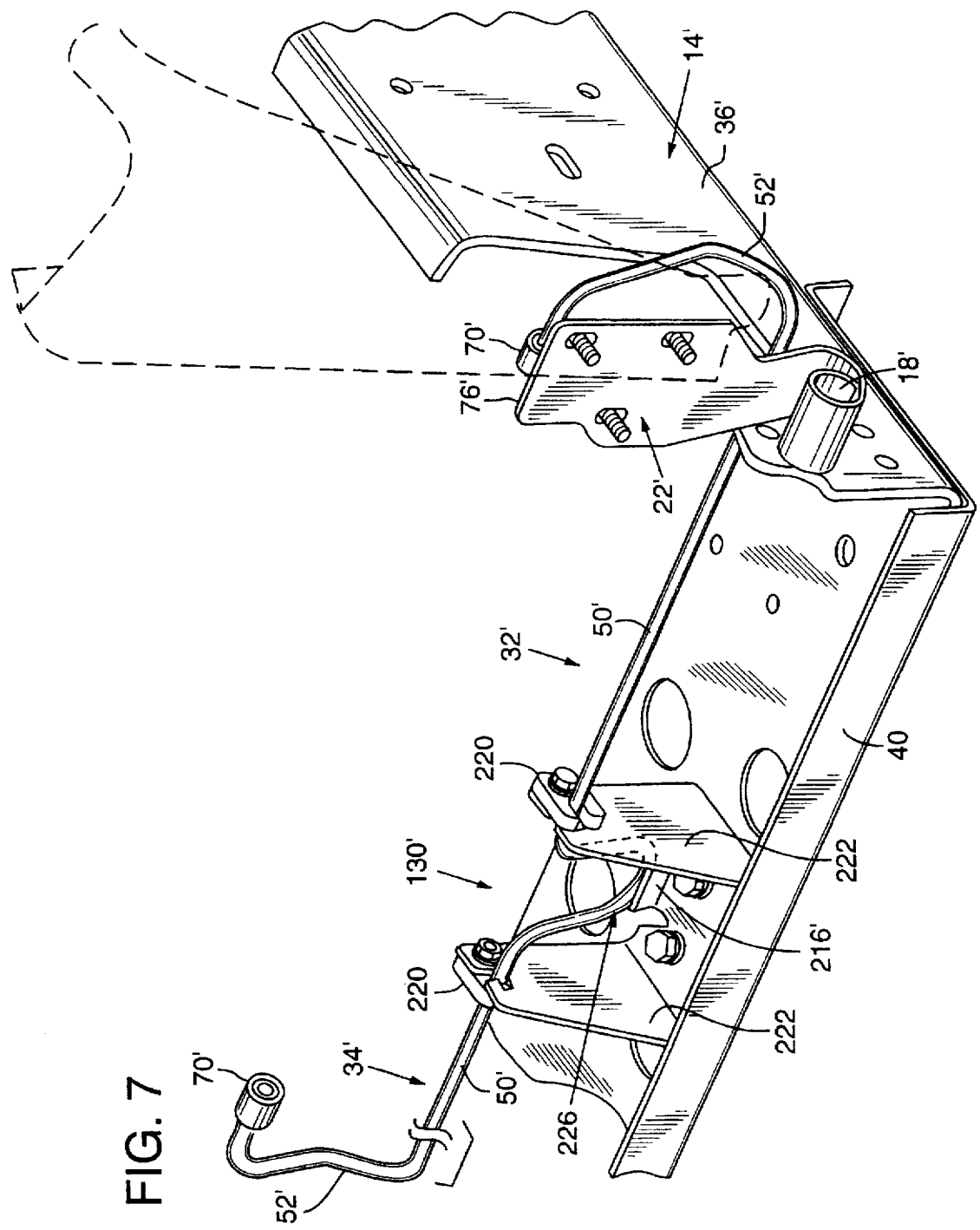

VEHICLE WITH TORSION BAR HOOD LIFT ASSIST

BACKGROUND OF THE INVENTION

The present invention relates to vehicles with a hood and which include a mechanism for assisting in lifting the hood to an open position. More specifically, the present invention relates to vehicles with torsion bar hood lifting assist devices.

It can be difficult to lift the hood of a vehicle and in particular the heavy hood of a truck. For example, a truck hood may weigh 150 pounds or more and can be difficult for a driver to lift without a hood lift assist mechanism.

U.S. Pat. No. 3,982,600 to Gerresheim et al. discloses one type of a hood lifting mechanism utilizing a pair of Z-shaped torsion bars held in position by shackles. One end of each of these torsion bars is inserted into a slotted shackle mounted to the hood of the vehicle. As the hood is closed, this end of each of the torsion bars is understood to slide through its respective shackle and also to pivot somewhat to twist the associated torsion bar. As a result, energy is stored and is subsequently available to assist in the hood opening procedure. In this approach, as each torsion bar end slides in its respective slotted shackle as the hood is closed, the moment arm between the sliding shackle and pivot axis of each of the torsion bars is understood to decrease in length. Consequently, the amount of energy stored during hood closing would be reduced.

U.S. Pat. No. 4,223,483 to Stafford discloses a torsion bar having crank arm portions each terminating in a nylon bushing at a respective side of the vehicle. The Stafford torsion bar is operable in combination with a sliding hood pivot assembly to provide lifting assistance as the hood is raised.

Yet another form of torsion bar assembly is shown in U.S. Pat. No. 4,359,121 to Messner et al. In the Messner design, two torsion bars are illustrated, each with a doubled back loop construction. In the Messner approach, each torsion bar has one end attached to the cover or hood of the vehicle and the other end attached to an arm of a yoke. This device is operable to assist in holding the cover in its raised position.

Although a number of torsion bar hood lift assemblies are known, a need nevertheless exists for an improved torsion bar hood lift assist mechanism and for vehicles with such mechanisms.

SUMMARY OF THE INVENTION

An improved torsion bar hood lift assist apparatus in accordance with the present invention provides an effective and efficient mechanism for storing energy during a hood closing operation. This stored energy is subsequently available during a hood opening operation to assist in lifting the hood.

In accordance with one specific aspect of the present invention, the hood lift assist includes a torsion bar coupled to a vehicle. The torsion bar may have an elongated twist body portion and a moment arm portion. The moment arm portion has a distal or free end portion which is positioned to engage and travel along an interior surface of the hood. As the vehicle hood is closed, the free end portion travels along the hood interior surface in one direction and also pivots the moment arm in a first direction to twist the twist body portion and store energy in the torsion bar. Conversely, when the vehicle hood is opened, the free end portion travels along the hood interior surface in a direction opposite to said one direction and also pivots the moment arm in a second direction opposite to the first direction. As a result, stored energy is transferred from the torsion bar to the hood to assist in lifting the hood.

In accordance with a more specific aspect of the present invention, the free end portion includes a guide member which engages and travels in contact with the hood interior surface. For example, the free end portion may be flattened or otherwise shaped to slide easily along the hood interior surface. The free end portion may also otherwise be coupled with the hood interior surface for easy relative motion. In a specifically preferred embodiment, the guide member comprises a roller mounted to the free end portion in a position to roll against the hood interior surface as the hood is opened and closed.

The hood may include a reinforcing member or guiding element positioned to receive the guide member such that the guide member travels in contact with the hood reinforcing member as the hood is opened and closed. In addition, the hood reinforcing member may comprise a hood mounting plate or bracket which is coupled to the hood and also to a hood pivot so as to pivotally couple the hood to the vehicle.

To minimize bending of the twist body portion of one form of a torsion bar, support is provided to the twist body portion at spaced apart locations adjacent to the respective ends of the twist body portion. For example, the twist body portion may be supported at an end portion spaced from the moment arm portion of the torsion bar and at a second location in proximity to the moment arm portion. To reduce friction and improve the efficiency of the energy transfer to and from the hood during opening and closing procedures, a bearing element, such as a bearing block, couples the twist portion of the torsion bar to its support in proximity to the moment arm portion of the torsion bar. In a specific form of the invention, a saddle mounting bracket is utilized to support the twist body portion of the torsion bar at a location which is near the moment arm portion. In addition, a torsion bar mounting bracket is utilized to support the twist body portion of the torsion bar at a location spaced from the saddle mounting bracket.

Plural torsion bars may be utilized, for example, each with a roller or other guide member which is coupled to a free end portion of the associated torsion bar. The rollers engage the hood interior surface. These torsion bars cooperate in transferring hood assist lifting energy from the respective torsion bars to the hood during hood opening. In one embodiment, each torsion bar engages the hood at a respective side of the vehicle. In an alternative embodiment, a unitary torsion bar may be utilized which has respective ends which engage the hood interior surface at respective sides of the vehicle. In this case, the torsion bar ends may also be provided with motion guiding members such as rollers.

The torsion bar, or bars in the case of a plural torsion bar assembly, may take any convenient shape. For example, the twist body portion may be straight and the moment arm portion may be straight. Alternatively, the twist body portion may be looped or coiled. The twist body portion may also have one end bent to more readily engage a mounting bracket to prevent pivoting of the twist body portion during operation of the hood lift assist device. In addition, the moment arm portion may be straight or may be bent to provide clearance for vehicle components which otherwise could interfere with the motion of the moment arm portion during opening and closing of the hood. In a specific embodiment, the moment arm portion projects at an angle of about ninety degrees from the twist body portion and extends toward the hood interior surface, although other angles are certainly suitable. The torsion bar may also have a first moment arm section projecting in an upward direction of about ninety degrees from a twist body straight section, a second moment arm section extending forwardly at about ninety-four degrees from the first Section, and a third section extending at about ninety-one degrees from the second section and in a direction which is generally parallel to the straight section of the twist body portion. In this case, a roller or other guide element is typically mounted to or formed at the third section. Again, these angles are variable and the phrase "about" with reference to a particular angle refers to an angle within approximately five degrees of the specified angle.

The present invention also extends to a vehicle with a hood, a frame and a torsion bar hood lift assist in accordance with the present invention as well as to torsion bars useful in the present invention.

These and other features, objects and advantages of the present invention become more apparent with reference to the following description and drawings.

BRIEF DESCRIPTION OF THE DRAWINGS

FIG. 1 is a side elevational view of a vehicle with a hood and frame and hood lift assembly in accordance with one embodiment of the present invention, the hood lift assembly being positioned to assist in lifting the hood as it is opened.

FIG. 2 is a partially exploded perspective view of the hood lift assembly of FIG. 1.

FIG. 3 is a top view of the hood lift assist apparatus of FIG. 2 in an assembled condition.

FIG. 3a is an enlarged, partial sectional view of a form of hood engagement roller usable in the FIGS. 2 and 3 assemblies.

FIG. 7 is a front perspective view of an alternative form of a hood lift assist assembly in accordance with the present invention.

DETAILED DESCRIPTION OF PREFERRED EMBODIMENTS

Figure 4:
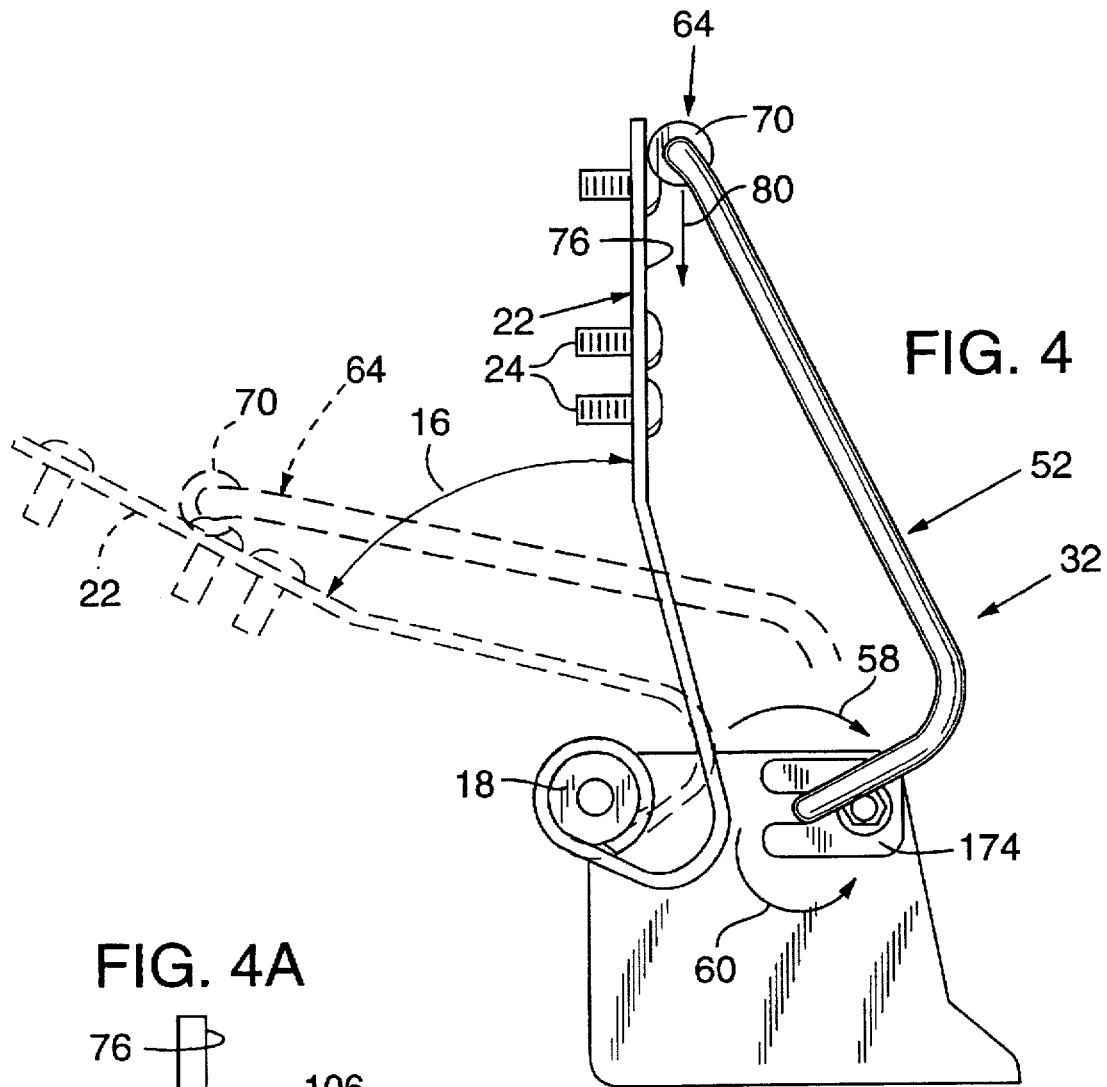
FIG. 4 is a simplified side elevational view of the hood assist assembly of FIG. 1, illustrating the operation of the torsion bar hood lift assist.

With reference to FIG. 1, a vehicle 10, such as a truck, is illustrated with a hood 12 pivotally mounted to the vehicle frame 14 for pivoting in the direction of an arrow 16 about a pivot 18 between respective closed and open positions. In FIG. 1, the hood is shown in solid lines in a closed position and in dashed lines in an open position. In the illustrated embodiment, a hood mounting bracket 22 is positioned against an interior surface of the hood and fastened, as by bolts 24, to the hood. The bracket 22 couples the hood to the pivot 18 and thus may be understood to be an element of the hood.

One form of torsion bar hood lift assist mechanism in accordance with the present invention is indicated generally at 30 in FIG. 1.

With reference to FIGS. 2 and 3, the torsion bar hood lift assist mechanism or assembly includes at least one torsion bar, in this case a pair of torsion bars 32, 34, mounted to the vehicle. More specifically, these torsion bars 32, 34 are coupled to longitudinally extending frame sections 36, 38 and to a cross frame section 40. Since each of the torsion bar assemblies are similar, the following discussion will proceed solely with reference to the portion of the lift assembly which includes torsion bar 32, it being understood that the portion with torsion bar 34 is similarly constructed.

The torsion bar 32 includes an elongated main or twist body portion 50 which is coupled to the vehicle so as to restrain the main body portion against pivoting movement at least at one end portion. The torsion bar is mounted so as to permit twisting of the twist body portion to store energy during closing of the hood and operation of the hood lift assist assembly. In addition, the torsion bar has a moment or bending arm portion 52 coupled to the twist body portion 50. During hood closing, the moment arm portion pivots in a first direction (as indicated by arrow 58 in FIG. 4) about the longitudinal axis of the main body portion 50 and the main body portion is twisted about its longitudinal axis. As a result, during hood closing energy is stored both in twisting the twist body portion 50 and in bending the moment arm portion 52. Conversely, when the vehicle hood is opened, the moment arm portion 52 pivots, relative to the longitudinal axis of the main body portion 50, in the direction of arrow 60 in FIG. 4. When this occurs, energy stored in the bending arm portion 52 and twist body portion 50 is transferred to the hood of the vehicle to assist in opening the hood.

During this hood opening or closing process, a free or distal end portion 64 of the torsion bar is coupled to an interior surface of the hood and travels along the hood interior surface. During opening of the hood, energy is transferred from this free end portion to the hood interior surface and thereby assists in hood opening. Conversely, during closing of the hood, energy is transferred to the free end portion and thus to the torsion bar.

Most preferably, the torsion bar includes a hood engagement element or member which travels in contact with the interior surface of the hood as the hood is opened and closed.

As shown in FIGS. 2 and 3, one form of hood engagement member comprises a roller 70 mounted to the free end portion 64 of the torsion bar 32. As shown in FIG. 4, the roller may be supported in a position to engage an interior surface 76 of the hood mounting bracket 22 and thereby an interior surface of the hood. The mounting bracket 22 thus comprises one form of a hood reinforcing plate against which the free end portion of the torsion bar moves during energy transfer. Assume the hood is pivoted from its closed position shown in solid lines in FIG. 4 to its open position shown in dashed lines in FIG. 4, this pivoting motion being indicated by arrow 16. In this case, the roller 70, and thus the distal end portion 64 of the torsion bar, travels relative to the hood interior surface in a direction indicated generally by arrow 80 while maintaining contact with the hood interior surface (in this case, the interior surface of plate 22).

The roller 70 provides an extremely effective relatively friction free contact between the free end portion of the torsion bar and the interior surface of the hood. As a result, more energy is available for hood lift assistance rather than being wasted in overcoming friction.

As shown in FIG. 3a, the roller 70 may be mounted to the torsion bar section 64 in any convenient manner. In one specific example, the roller 70 includes a steel insert tube 86 lining an aperture 88 through the roller 70. The distal end portion 64 of the torsion bar 32 is inserted through the insert tube 86. In addition, first and second washers 90, 92 abut the roller 70 and tube 88. A fastener, such as a conventional hose clamp (such as a clutch type hose clamp from EATON Corporation of Cleveland, Ohio), limits the sliding of the roller along the torsion bar section 64. In addition, a Conventional shaft gripping ring 96 (such as a stud receiving push-on self-locking fastener from EATON Corporation) receives the tip or end 98 of the torsion bar section 64 and cooperates with the fastener 94 to hold the roller in the desired position along the torsion bar section 64.

The roller 70 may be of any suitable material capable of withstanding the forces generated during opening and closing the hood a multiplicity of times. As a specific example, a polymer material, such as urethane having a high durometer (for example, 90 on the Shore A scale), may be used.

Figure 4A:
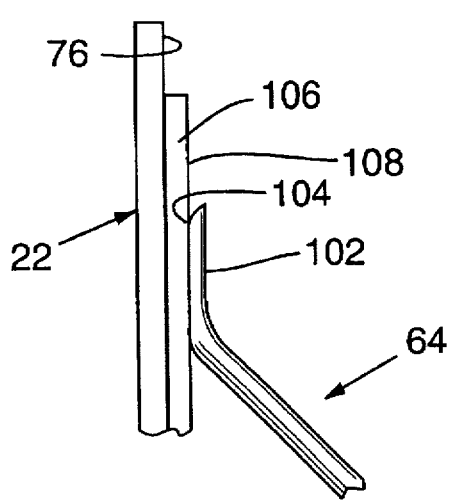
FIG. 4a is a partially broken away side elevational view of a torsion bar hood lift assembly with an alternative form of hood guide member.

As yet another example of a guide member, the distal end portion 64, as shown in FIG. 4a, may be flattened at its outermost end 102 to provide a bearing surface 104. In addition, a friction reducing material, such as a wear pad 106 of an ultra-high molecular weight polyethylene material, may be mounted to the surface 76 of the reinforcing plate 22 as shown in this figure. The pad 106 may be held in place, for example, by a pressure sensitive adhesive tape. The flattened surface 104 of torsion bar section 64 easily slides on the exposed outer surface 108 of the wear pad. The top and bottom of the flattened surface 10 may be turned up with a radius to allow for easy engagement. This approach thus comprises another example of a structure for coupling the torsion bar free end portion to the hood interior surface in a way that effectively transfers energy between the torsion bar and hood during the hood lifting or opening procedure. However, a sliding coupling as shown in FIG. 4a is not as efficient at reducing friction as the roller of the FIGS. 2 and 3 embodiment.

In general, any coupling mechanism may be used for coupling the free end portion of the torsion bar to the hood interior surface which allows linear movement of the free end portion of the torsion bar along the hood interior surface. Because of this construction, a relatively long moment arm is maintained during the hood opening and closing and contributes to the effectiveness of the energy transfer between the torsion bar and hood.

The torsion bar may be made of any material which readily stores and transfers energy during closing and opening of the hood. A specifically preferred material is ASTM A401 Chromium Silicon steel having a diameter ranging from about 0.4 to about 0.6 inch. The thickness and geometry of the torsion bar determines the amount of hood lift assist provided by the mechanism. For example, assume the hood weight is approximately 170 pounds, the center of gravity of the hood is 30 inches from the hood pivot axis (18 in FIG. 1), and that the handle on the hood is located approximately 32 inches from the hood pivot axis. Also, assume that two torsion bars are used in FIG. 2, that the moment arm of each torsion bar section 52 is ten inches (that is, the distance from the axis of roller 70 to the longitudinal axis of main body portion 50 is ten inches) and that 0.500 inch diameter ASTM A401 Chromium Silicon steel is utilized for the torsion bar. Under these conditions, it has been determined that a person lifting the hood must apply about nine pounds of lifting force with the remainder of the lifting force being provided by energy stored in the torsion bars.

Referring again to FIGS. 2 and 3, the illustrated torsion bar 32 has a main body portion 50 which, again, in this case, is generally straight. This provides a simplified construction for the torsion bar, although this torsion bar section may be convoluted or otherwise shaped, if desired. In addition, the innermost end of the torsion bar 32, the end closest to the longitudinal center of the vehicle, is bent at location 120 to an angle $\omega$ so as to provide a bracket engagement portion 122 projecting out of the longitudinal axis of main body portion 50. As shown in FIG. 3, the torsion bar portion 122 engages a wall of a mounting bracket 130, which restrains the torsion bar against pivoting at this location. A clip 124 is utilized to tie the respective adjoining ends of the torsion bars 32, 34 together in bracket 130.

The moment arm portion 52 of the torsion bar 32 of this form of the invention includes plural sections. More specifically, a first section 134 extends upwardly relative to main body portion 50 at an angle $\alpha$ which is about 90 degrees. In addition, a second section 136 of moment arm portion 52 extends at an angle $\beta$ from section 134, $\beta$ being about 94 degrees. Finally, a third section 138 of the moment arm portion 52, the roller supporting section or free end portion 64, extends at an angle $\theta$ of about 91 degrees in a direction generally parallel to the longitudinal axis of the main body section 50. The angles identified above for $\omega$, $\alpha$, $\beta$ and $\theta$ are the angles for a preferred embodiment of this particular torsion bar and are established so that the torsion bar clears components of the vehicle (not shown in these figures) which otherwise could interfere with the movement of the torsion bar. Other angles may also be utilized and are typically within about five degrees of the preferred angles to fall within the term "about" when this word is used in reference to a particular angle. In the absence of an obstruction posed by other vehicle components, the moment arm portion 52 may take other shapes and, for example, may be straight.

Each of the torsion bars 32, 34 is preferably supported at only two locations to minimize friction and also to minimize bending of the twist body portion 50 as the hood is raised and lowered. More specifically, the twist body portion 50 is supported at end portion 120 by the mounting bracket 130 and supported proximate to the moment arm portion 52 by a saddle mounting bracket 170.

As best seen in FIG. 2, the saddle mounting bracket 170 is mounted to frame section 36. Bracket 170 includes a slot 172 through which the end portion 122 of the torsion bar 32 may be inserted for positioning in engagement with the mounting bracket 130. A bearing, such as a bearing block 174, is mounted to the saddle mounting bracket 170 and, as best seen in FIG. 3, bears against the twist body portion 50 at location 180 adjacent to or near the moment arm portion 52 of the torsion bar. The illustrated bearing block 174 is provided with an aperture 182 which is typically lined with a steel tube (not shown). A fastener, such as a bolt 184, is inserted through the aperture 182 and through a hole through a sidewall of the saddle mounting bracket 170 to secure the bearing block in place. The bearing block is typically made of a durable material such as acetal containing teflon fibers. DELRIN material from dupont is a specifically preferred example. The bearing block 174, in combination with the roller 70, cooperate to reduce friction arising from movement of the torsion bar during opening and closing of the vehicle hood. The bearing block 174 specifically permits pivoting movement of the twist body portion 50 about its longitudinal axis as energy is stored by the twist body portion.

Figure 5:
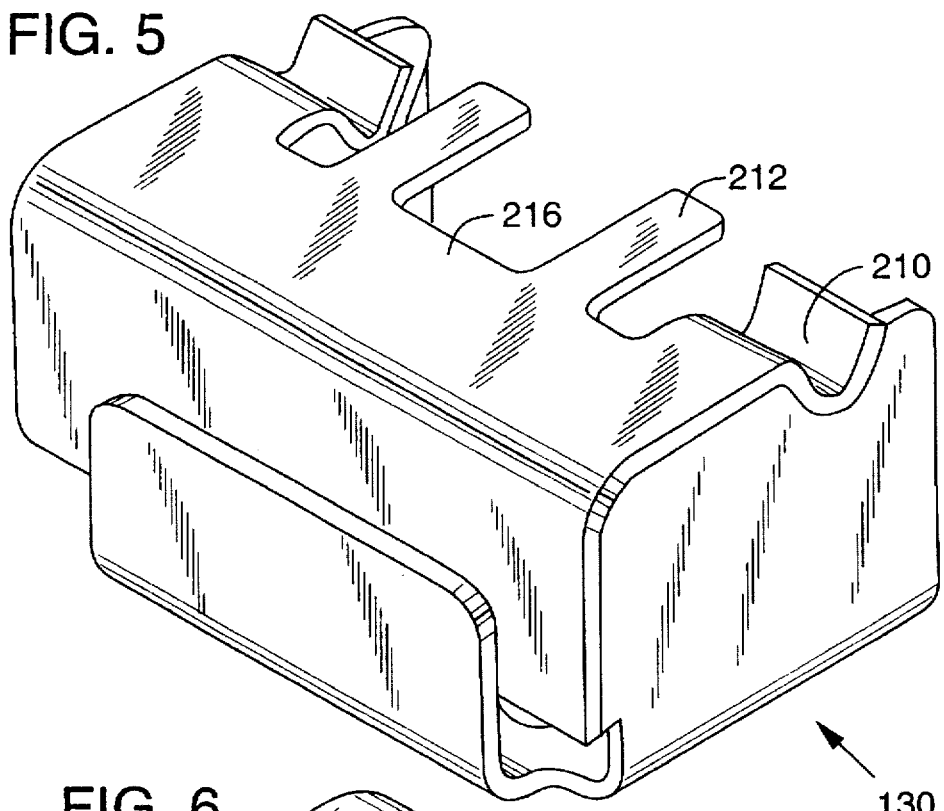
FIG. 5 is a front perspective view of one form of a torsion bar mounting bracket in accordance with the present invention.
Figure 6:
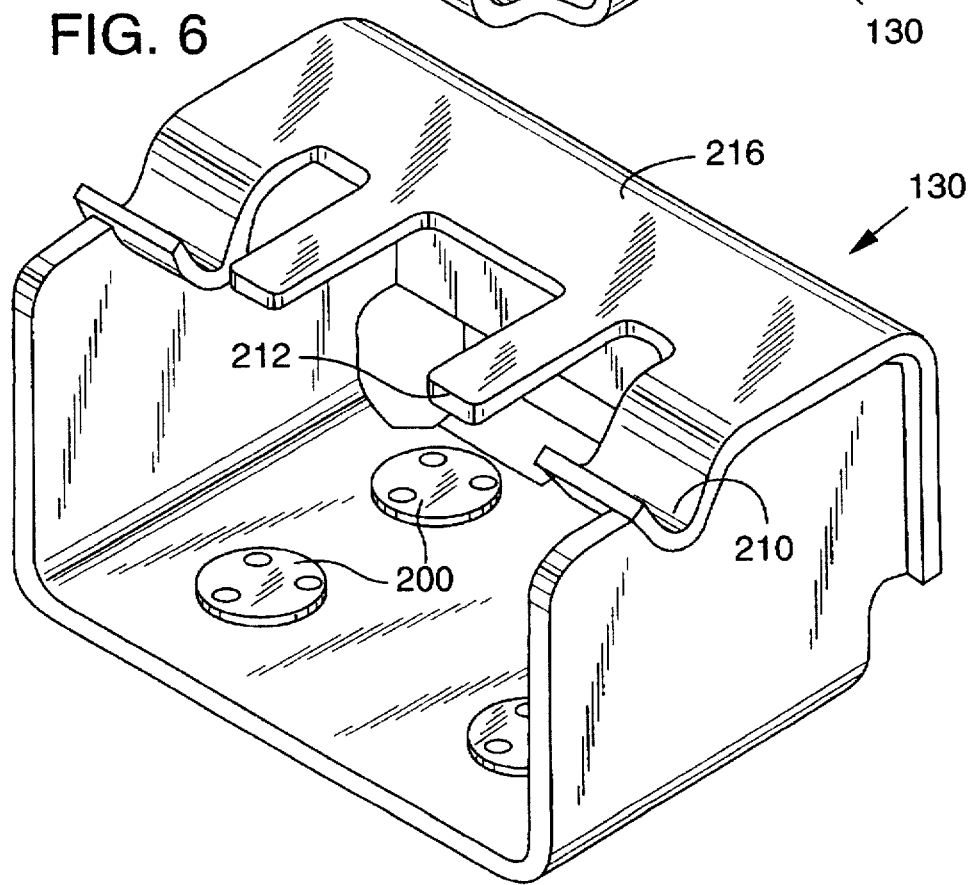
FIG. 6 is a rear perspective view of the mounting bracket of FIG. 5.

The mounting bracket 130 is typically made from two sections which are secured together, as by welding, as shown (see FIGS. 2, 5 and 6), to form a box-like mounting bracket housing which is open from the rear. Projecting stud fasteners, some being indicated at 200 in FIG. 2, pass through corresponding openings in a mounting plate 204 and also through apertures, some being numbered as 206 in FIG. 2, provided through the frame cross piece 40. Conventional locking cap fasteners, some being indicated at 208 in FIG. 2, secure the studs at the underside of frame cross piece 40 and thereby mount the bracket 130 in place. The upper section of the mounting bracket 130 defines a generally U-shaped slot 210 within which the torsion bar rests (see location 211 in FIG. 3) when mounted in place. The upper section of mounting bracket 130 also includes a projecting flange 212 which, as best seen in FIG. 3, overlays and assists in retaining the torsion bar in position. A central portion 216 of the mounting bracket 130 engages the end 122 of the torsion bar and prevents the torsion bar from pivoting at this location.

FIG. 7 illustrates an alternative embodiment of the present invention. In this embodiment, elements with like functions to those of the embodiment of FIGS. 1-4 are labeled with identical numbers with a "'" (prime) indication and therefore will not be discussed further. It should be noted that in the FIG. 7 form of the invention, the torsion bar comprises a unitary bar extending from side to side of the vehicle. This torsion bar has respective twist arm portions 50' and moment arm portions 52' positioned on opposite sides of the vehicle, each with a respective hood engagement member, such as a roller 70', for engaging the hood. The torsion bar twist body portions 50' are located at opposite sides of the centrally positioned mounting bracket 130'. The center of this form of torsion bar is bent, such as in a generally U-shaped configuration, as indicated at 226. In this case, the central mounting bracket 130' has an upwardly projecting flange 216 which engages the U-shaped bent portion of the torsion bar and prevents relative forward pivoting movement of the torsion bar at this location. In addition, a pair of bearing blocks 220, mounted to sidewall sections 222 of the bracket 130', support the torsion bar at the location where the torsion bar enters the mounting bracket 130'. In addition, other like bearing blocks, not shown, respectively engage the torsion bar sections 50' adjacent to each of the moment arm portions 52'. In this manner, two-point support is provided for each of the torsion bar twist sections 50'.

With reference to FIGS. 1 and 4, as the hood is moved from an open position (shown in dashed lines in FIGS. 1 and 4) to a closed position (shown in solid lines in FIGS. 1 and 4), the hood engagement element, such as roller 70, rolls in contact with an interior surface of the hood. As this occurs, the torsion bar 32 bends and twists and stores energy. During opening of the hood, the torsion bar free end portion again moves in engagement with an interior surface of the hood, but in the opposite direction, with the torsion bar transferring stored energy to the hood to provide a hood assist.

Having illustrated and described the principles of my invention with reference to several preferred embodiments, it should be apparent to those of ordinary skill in the art that my invention may be changed in arrangement and detail without departing from the inventive principles thereof. I claim as my invention all such modifications which fall within the scope of the following claims.

I claim:

1. A hood lifting assist apparatus mounted to a vehicle for applying a hood lifting force to an interior surface of the hood of a vehicle as the hood is being opened, the apparatus comprising:

a torsion bar mounted to the vehicle, the torsion bar having an elongated twist body portion restrained against pivoting movement and a moment arm portion coupled to the twist body portion so as to twist the twist body portion as the moment arm pivots in a first direction and to untwist the twist body portion as the moment arm pivots in a second direction opposite to the first direction, the moment arm portion having a distal or free end portion positioned to engage and travel along the interior surface of the vehicle hood, such that as the vehicle hood is closed the free end portion travels along the hood interior surface in one direction and also pivots the moment arm in the first direction to thereby twist the twist body portion to store energy in the torsion bar, and such that as the vehicle hood is opened the free end portion travels along the hood interior surface in a direction opposite to said one direction and also pivots the moment arm in the second direction to thereby untwist the twist body portion and transfer stored energy from the torsion bar to the hood and assist in opening the hood.

2. A hood lifting assist apparatus mounted to a vehicle according to claim 1 in which the hood is pivotally attached to the vehicle for pivoting about a hood pivot axis between open and closed positions, and wherein the twist body portion has a longitudinal axis which is spaced from the hood pivot axis.

3. A hood lifting assist apparatus mounted to a vehicle according to claim 1 in which the free end portion comprises a monolithic extension of the twist body portion includes a guide member which engages and travels in contact with the hood interior surface.

4. A hood lifting assist apparatus mounted to a vehicle according to claim 3 in which the guide member comprises a roller mounted to the free end portion in position to roll against the hood interior surface as the hood is opened and closed.

5. A hood lifting apparatus mounted to a vehicle according to claim 3 in which the hood includes a hood reinforcing plate positioned to receive the guide member such that the guide member travels in contact with the hood reinforcing plate as the hood is opened and closed.

6. A hood lifting apparatus mounted to a vehicle according to claim 5 including a pivot and in which the hood reinforcing plate engages the pivot to pivotally couple the hood to the vehicle.

7. A hood lifting apparatus mounted to a vehicle according to claim 1 in which the twist body portion is supported solely at (a) an end portion opposite to the moment arm portion; and (b) at a portion in proximity to the moment arm portion.

8. A vehicle with a hood lifting assist apparatus for applying a hood lifting force to an interior surface of a hood of a vehicle as the hood is being opened, the apparatus comprising:

a torsion bar mounted to the vehicle, the torsion bar having an elongated twist body portion restrained against pivoting movement and a moment arm portion coupled to the twist body portion so as to twist the twist body portion as the moment arm pivots in a first direction and to untwist the twist body portion as the moment arm pivots in a second direction opposite to the first direction, the moment arm portion having a distal or free end portion positioned to engage and travel along the interior surface of the vehicle hood, such that as the vehicle hood is closed the free end portion travels along the hood interior surface in one direction and also pivots the moment arm in the first direction to thereby twist the twist body portion to store energy in the torsion bar, and such that as the vehicle hood is opened the free end portion travels along the hood interior surface in a direction opposite to said one direction and also pivots the moment arm in the second direction to thereby untwist the twist body portion and transfer stored energy from the torsion bar to the hood and assist in opening the hood;

wherein the twist body portion is supported solely at (a) an end portion opposite to the moment arm portion; and (b) at a portion in proximity to the moment arm portion; and a bearing block coupled to the torsion bar proximate to the moment arm portion.

9. A vehicle with a hood lifting assist apparatus for applying a hood lifting force to an interior surface of a hood of the vehicle as the hood is being opened, the apparatus comprising:

a torsion bar mounted to the vehicle, the torsion bar having an elongated twist body portion restrained against pivoting movement and a moment arm portion coupled to the twist body portion so as to twist the twist body portion as the moment arm pivots in a first direction and to untwist the twist body portion as the moment arm pivots in a second direction opposite to the first direction, the moment arm portion having a distal or free end portion positioned to engage and travel along the interior surface of the vehicle hood, such that as the vehicle hood is closed the free end portion travels along the hood interior surface in one direction and also pivots the moment arm in the first direction to thereby twist the twist body portion to store energy in the torsion bar, and such that as the vehicle hood is opened the free end portion travels along the hood interior surface in a direction opposite to said one direction and also pivots the moment arm in the second direction to thereby untwist the twist body portion and transfer stored energy from the torsion bar to the hood and assist in opening the hood; and a saddle mounting bracket coupled to the vehicle and to the twist body portion at a location proximate to the moment arm portion and a torsion bar mounting bracket coupled to the vehicle and to the twist body portion of the torsion bar at a location which is spaced from the moment arm portion and also spaced from the saddle mounting bracket, the torsion bar mounting bracket engaging and restraining one end portion of the twist body portion against pivoting movement.

10. A hood lifting apparatus mounted to a vehicle according to claim 1 in which there are first and second torsion bars, each having a roller coupled to a free end portion of the torsion bar, the roller of the first torsion bar being positioned to engage the hood interior surface at one side of the vehicle and the roller of the second torsion bar being positioned to engage the hood interior surface at the opposite side of the vehicle, and wherein the torsion bars each have an end portion opposite to the free end portion which is positioned near the center of the vehicle.

11. A hood lifting apparatus mounted to a vehicle according to claim 1 in which the torsion bar includes respective first and second twist body portions, first and second moment arm portions and first and second free end portions, each free end portion being positioned to engage the hood interior surface at a respective side of the vehicle.

12. A vehicle with a hood lifting assist apparatus for applying a hood lifting force to an interior surface of a hood of the vehicle as the hood is being opened, the apparatus comprising:

a torsion bar mounted to the vehicle, the torsion bar having an elongated twist body portion restrained against pivoting movement and a moment arm portion coupled to the twist body portion so as to twist the twist body portion as the moment arm pivots in a first direction and to untwist the twist body portion as the moment arm pivots in a second direction opposite to the first direction, the moment arm portion having a distal or free end portion positioned to engage and travel along the interior surface of the vehicle hood, such that as the vehicle hood is closed the free end portion travels along the hood interior surface in one direction and also pivots the moment arm in the first direction to thereby twist the twist body portion to store energy in the torsion bar, and such that as the vehicle hood is opened the free end portion travels along the hood interior surface in a direction opposite to said one direction and also pivots the moment arm in the second direction to thereby untwist the twist body portion and transfer stored energy from the torsion bar to the hood and assist in opening the hood; and in which the torsion bar when mounted comprises a twist body portion having a substantially horizontal straight section and the moment arm portion includes a first section projecting in an upward direction at about a ninety degree angle from the straight section, a second section extending forwardly at about a ninety degree angle from the first section, and a third section extending at about a ninety degree angle from the second section and in a direction generally parallel to the straight section, and the free end portion comprising the third section with a roller rotatably mounted to the third section.

13. A vehicle comprising:

a vehicle frame;

a vehicle hood pivoted to the vehicle frame;

a torsion bar coupled to the vehicle frame, the torsion bar having a twist energy storing portion having a first end portion restrained against pivoting motion and a second end portion, the torsion bar also including a bending energy storage portion coupled at one end to the second end portion and having a free end portion coupled to an interior surface of the vehicle hood such that, as the vehicle hood is closed, the free end portion travels in engagement with the hood in a first direction and bends the bending energy storage portion and twists the twist body portion to thereby store energy in the torsion bar, and, as the vehicle hood is opened, the free end portion travels in engagement with the hood in a direction opposite to the first direction, the bending energy storage portion relaxes and the twist body portion untwists to thereby transfer stored energy from the torsion bar to the hood and assist in opening the hood.

14. A vehicle according to claim 13, in which the free end portion includes a hood engagement member positioned to travel in contact with the hood.

15. A vehicle according to claim 14 in which the hood engagement member comprises a roller rotatably coupled to the free end portion of the torsion bar in position to roll against the hood as the hood is opened and closed.

16. A vehicle having a hood lifting assist apparatus for applying a hood lifting force to the hood of the vehicle as the hood is being opened, the apparatus comprising:

a torsion bar mounted to the vehicle, the torsion bar having an elongated first body portion restrained against pivoting movement, and a bending arm portion which comprises a monolithic extension of the first body portion, the bending arm portion having a free end portion, the free end portion being positioned to engage and travel along the vehicle hood in one direction as the vehicle hood is closed and in a second direction opposite to the first direction as the vehicle hood is opened, whereby as the free end portion travels along the hood in the first direction, the bending arm portion pivots in a first direction and twists the first body portion to store energy in the torsion bar, and whereby as the vehicle hood is opened the free end portion travels in the second direction and the bending arm portion pivots in a direction opposite to the first direction such that the first body portion untwists and stored energy is transferred from the torsion bar to the hood to thereby assist in opening the hood; and the bending arm portion projecting at an angle from the first body portion, and the free end portion including a hood engagement element for moving along an interior surface of the hood when the torsion bar is installed so as to reduce friction between the torsion bar and the vehicle hood as hood lifting energy is delivered to the hood during opening of the hood.

17. A vehicle having a hood lift apparatus according to claim 16 in which the hood engagement element comprises a roller.

18. A vehicle having a hood lifting assist apparatus for applying a hood lifting force to the hood of the vehicle as the hood is being opened, the apparatus comprising:

a torsion bar mounted to the vehicle, the torsion bar having an elongated first body portion restrained against pivoting movement, and a bending arm portion with a free end portion, the free end portion being positioned to engage and travel along the vehicle hood in one direction as the vehicle hood is closed and in a second direction opposite to the first direction as the vehicle hood is opened, whereby as the free end portion travels along the hood in the first direction, the bending arm portion pivots in a first direction and twists the first body portion to store energy in the torsion bar, and whereby as the vehicle hood is opened the free end portion travels in the second direction and the bending arm portion pivots in a direction opposite to the first direction such that the first body portion untwists and stored energy is transferred from the torsion bar to the hood to thereby assist in opening the hood;

the bending arm portion projecting at an angle from the first body portion, and the free end portion including a hood engagement element for moving along an interior surface of the hood when the torsion bar is installed so as to reduce friction between the torsion bar and the vehicle hood as hood lifting energy is delivered to the hood during opening of the hood;

the hood engagement element comprising a roller; and a bearing block coupled to the main body portion proximate to the bending arm portion.

19. A vehicle with a hood lifting assist apparatus for applying a hood lifting force to the hood of the vehicle as the hood is being opened, the apparatus comprising:

at least one torsion bar mounted to the vehicle, the torsion bar having an elongated first body portion restrained against pivoting movement, a free end portion, and a roller mounted to the free end portion in a position to engage the vehicle hood such that as the vehicle hood is closed the roller moves along a surface of the hood in one direction and the free end portion pivots in engagement with the hood in a first direction and twists the first body portion to thereby store energy in the torsion bar, and such that as the vehicle hood is opened the roller moves along the surface of the hood in a direction opposite to said one direction and the free end portion pivots in engagement with the hood in a direction opposite to the first direction and the first body portion untwists to thereby transfer stored energy from the torsion bar to the hood to thereby assist in opening the hood;

the hood including a hood mounting plate pivotally coupling the hood to the vehicle, the hood mounting plate being positioned such that the roller rolls against the hood mounting plate as the hood is opened and closed;

a saddle mounting bracket coupled to the vehicle and to the first body portion of the torsion bar at a location proximate to the free end portion of the torsion bar;

a torsion bar mounting bracket coupled to the vehicle and to the first body portion of the torsion bar at a location spaced from the free end portion and from the saddle mounting bracket, the mounting bracket engaging and restraining the first body portion of the torsion bar against pivoting movement; and the saddle mounting bracket supporting a bearing block which receives the torsion bar.

20. A vehicle with a hood lifting apparatus according to claim 19 in which there are first and second torsion bars, each with a respective roller, a first torsion bar being positioned to engage the hood at one side of the vehicle and the second torsion bar being positioned to engage the hood at the opposite side of the vehicle.

21. A vehicle with a hood lifting apparatus according to claim 19 in which the torsion bar is unitary with first and second free end portions, each free end portion supporting a roller and wherein the rollers are respectively positioned to engage the hood at the respective sides of the vehicle.

22. A vehicle with a hood lifting apparatus according to claim 19 in which the torsion bar when mounted comprises a first body portion having a substantially horizontal straight section and the free end portion includes a first section connected to the straight section and extending in an upward direction at about a ninety degree angle from the straight section, a second section extending forwardly at about a ninety degree angle from the first section, and a third section extending at about a ninety degree angle from the second section and in a direction generally parallel to the straight section, and the roller being rotatably mounted to the third section.

* * * * *